(12) United States Patent
Roeck

(10) Patent No.: US 7,970,000 B2
(45) Date of Patent: Jun. 28, 2011

(54) INCREASING THE NUMBER OF SUPPORTED DEVICES ON A DOCSIS INTERFACE

(75) Inventor: Guenter E. Roeck, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 806 days.

(21) Appl. No.: 11/197,685

(22) Filed: Aug. 3, 2005

(65) Prior Publication Data

US 2007/0033621 A1 Feb. 8, 2007

(51) Int. Cl.
*H04L 12/12* (2006.01)
(52) U.S. Cl. .................. 370/420; 725/116
(58) Field of Classification Search .............. 370/311; 455/343.1
See application file for complete search history.

(56) References Cited

U.S. PATENT DOCUMENTS

| | | | | |
|---|---|---|---|---|
| 4,554,579 A * | 11/1985 | Citta | ............. | 725/131 |
| 5,483,517 A * | 1/1996 | Kurata et al. | ............. | 370/241 |
| 6,178,447 B1 * | 1/2001 | Wannenmacher et al. | ... | 709/219 |
| 6,189,102 B1 * | 2/2001 | Beser | ............. | 726/2 |
| 6,271,893 B1 * | 8/2001 | Kawaguchi et al. | ............. | 348/725 |
| 6,370,147 B1 * | 4/2002 | Beser | ............. | 370/401 |
| 6,442,158 B1 * | 8/2002 | Beser | ............. | 370/352 |
| 6,490,727 B1 * | 12/2002 | Nazarathy et al. | ............. | 725/129 |
| 6,510,162 B1 * | 1/2003 | Fijolek et al. | ............. | 370/432 |
| 6,523,126 B1 * | 2/2003 | Brabenac | ............. | 713/323 |
| 6,526,070 B1 * | 2/2003 | Bernath et al. | ............. | 370/509 |
| 6,658,010 B1 * | 12/2003 | Enns et al. | ............. | 370/401 |
| 6,658,231 B2 * | 12/2003 | Nakatsuyama | ............. | 455/3.06 |
| 6,690,655 B1 * | 2/2004 | Miner et al. | ............. | 370/278 |
| 6,779,050 B2 * | 8/2004 | Horton et al. | ............. | 710/30 |
| 6,788,950 B1 * | 9/2004 | Raissinia et al. | ............. | 455/522 |
| 7,065,378 B1 * | 6/2006 | Raissinia et al. | ............. | 455/522 |
| 7,075,903 B1 * | 7/2006 | Solum | ............. | 370/311 |
| 7,085,287 B1 * | 8/2006 | Chapman | ............. | 370/468 |
| 7,103,067 B1 * | 9/2006 | Singh et al. | ............. | 370/467 |
| 7,184,428 B1 * | 2/2007 | Gerszberg et al. | ............. | 370/352 |
| 7,221,712 B1 * | 5/2007 | Schwartzman et al. | ............. | 375/257 |
| 7,260,143 B2 * | 8/2007 | Matsuura | ............. | 375/222 |
| 7,272,846 B2 * | 9/2007 | Williams et al. | ............. | 725/111 |
| 7,359,332 B2 * | 4/2008 | Kolze et al. | ............. | 370/252 |
| 7,366,930 B2 * | 4/2008 | Gutman et al. | ............. | 713/320 |
| 7,389,528 B1 * | 6/2008 | Beser | ............. | 725/111 |
| 7,412,150 B2 * | 8/2008 | Nishikawa et al. | ............. | 386/83 |
| 7,447,486 B2 * | 11/2008 | Tamura et al. | ............. | 455/154.1 |
| 7,587,746 B1 * | 9/2009 | Schwartzman et al. | ............. | 725/111 |
| 7,668,195 B2 * | 2/2010 | Stone | ............. | 370/465 |
| 2001/0038647 A1 * | 11/2001 | Bernath et al. | ............. | 370/503 |
| 2002/0152473 A1 * | 10/2002 | Unger | ............. | 725/120 |
| 2003/0182429 A1 * | 9/2003 | Jagels | ............. | 709/227 |
| 2004/0003296 A1 * | 1/2004 | Robert et al. | ............. | 713/300 |
| 2004/0057576 A1 * | 3/2004 | Lavaud et al. | ............. | 379/413 |
| 2004/0180702 A1 * | 9/2004 | Hughes | ............. | 455/574 |

(Continued)

*Primary Examiner* — Ricky Ngo
*Assistant Examiner* — Ben H Liu
(74) *Attorney, Agent, or Firm* — Marger Johnson & McCollom, P.C.

(57) ABSTRACT

A network device communicates in a cable network. The network device has a port to allow the device to communicate on a cable network. The network device also has a processor to send a message indicating that the device is assuming a dormant state. The processor then assumes a dormant state for the device, releasing the service identifiers and service flows associated with that device for use in the cable network.

6 Claims, 4 Drawing Sheets

U.S. PATENT DOCUMENTS

2005/0193424 A1* 9/2005 Matsuura ................... 725/127
2005/0265338 A1* 12/2005 Chapman et al. ............ 370/389
2005/0265397 A1* 12/2005 Chapman et al. ............ 370/490
2005/0289624 A1* 12/2005 Shin .......................... 725/100
2006/0002294 A1* 1/2006 Chapman et al. ............ 370/229
2006/0126505 A1* 6/2006 Denney et al. .............. 370/229

* cited by examiner

INCREASING THE NUMBER OF SUPPORTED DEVICES ON A DOCSIS INTERFACE

BACKGROUND

Cable networks have been traditionally used to transmit video to users through their cable set-top boxes. The transmissions originate at a head-end, generally at a central location provided by the cable network provider. The transmission is received at the user end by a cable set-top box.

Using the infrastructure already established for the cable network, cable network providers began providing data services to users. With the use of a cable modem, users can transmit and send data across the network to other networks, such as packet-based networks like the Internet. The transmission travels upstream from the cable modem to the head-end, or a hub, where it is terminated by a cable modem termination system (CMTS). The CMTS then transmits the data out of the hub or head end to the packet network.

The CMTS also transmits the data from the packet network to the cable modem. Data is transmitted on one or more TV channels within the spectrum available for transmissions. The establishment, management and control of these channels is generally done using the Data-Over-Cable System Interface Specification (DOCSIS) standard. The standard allows the manufacturers of cable modems and CTMS equipment to ensure their equipment will function in the network, as well as allowing network providers to ensure that the network provides compatible services.

Currently, the DOCSIS specifications have a limited number of devices they can support per channel. A typical example is 8,191 modems per downstream channel, also referred to as a CMTS interface. This limit is due to the number of service identifiers (SIDs) used to identify a communication channel from the cable modem to the CMTS, referred to as an upstream channel.

Currently, SIDs are unique to a DOCSIS domain, where a DOCSIS domain may be defined as a collection of upstream and downstream channels for which a single MAC (media access control) allocation and management protocol operates. An upstream channel is a channel from the subscriber modem to the CMTS. A downstream channel is from a CMTS to a subscriber modem.

Two possible options to correct the issue of limitation of the number of supported devices per channel have been proposed. One proposal is to use more bits to define a SID, allowing a larger address space for the SIDs. However, this eliminates some of the SID space previously assigned as multicast/broadcast SIDs.

Another option would be to allow reuse of the SIDs within a DOCSIS domain, defining the SID space to be per upstream channel rather than per DOCSIS domain. This means that a SID on upstream channel 0 could be re-used on channel 1 within the same DOCSIS domain. Currently, if upstream channels 0 and 1 are in the same DOCSIS domain, a SID used on upstream channel 1 would not be used on channel 0. Using the same SID on different upstream channels eliminates some error capabilities that would otherwise be available.

For example, a CMTS receiving a packet on an upstream channel can currently check the validity of requests and messages by comparing the upstream channel identifier and the SID of received messages with the expected values. If the values do not match, the packet is discarded. With the above proposal, this type of checking is no longer possible because the combination of upstream channel ID and SID may be valid for all upstream channels.

BRIEF DESCRIPTION OF THE DRAWINGS

Embodiments of the invention may be best understood by reading the disclosure with reference to the drawings, wherein.

DETAILED DESCRIPTION OF THE EMBODIMENTS

Figure 1:
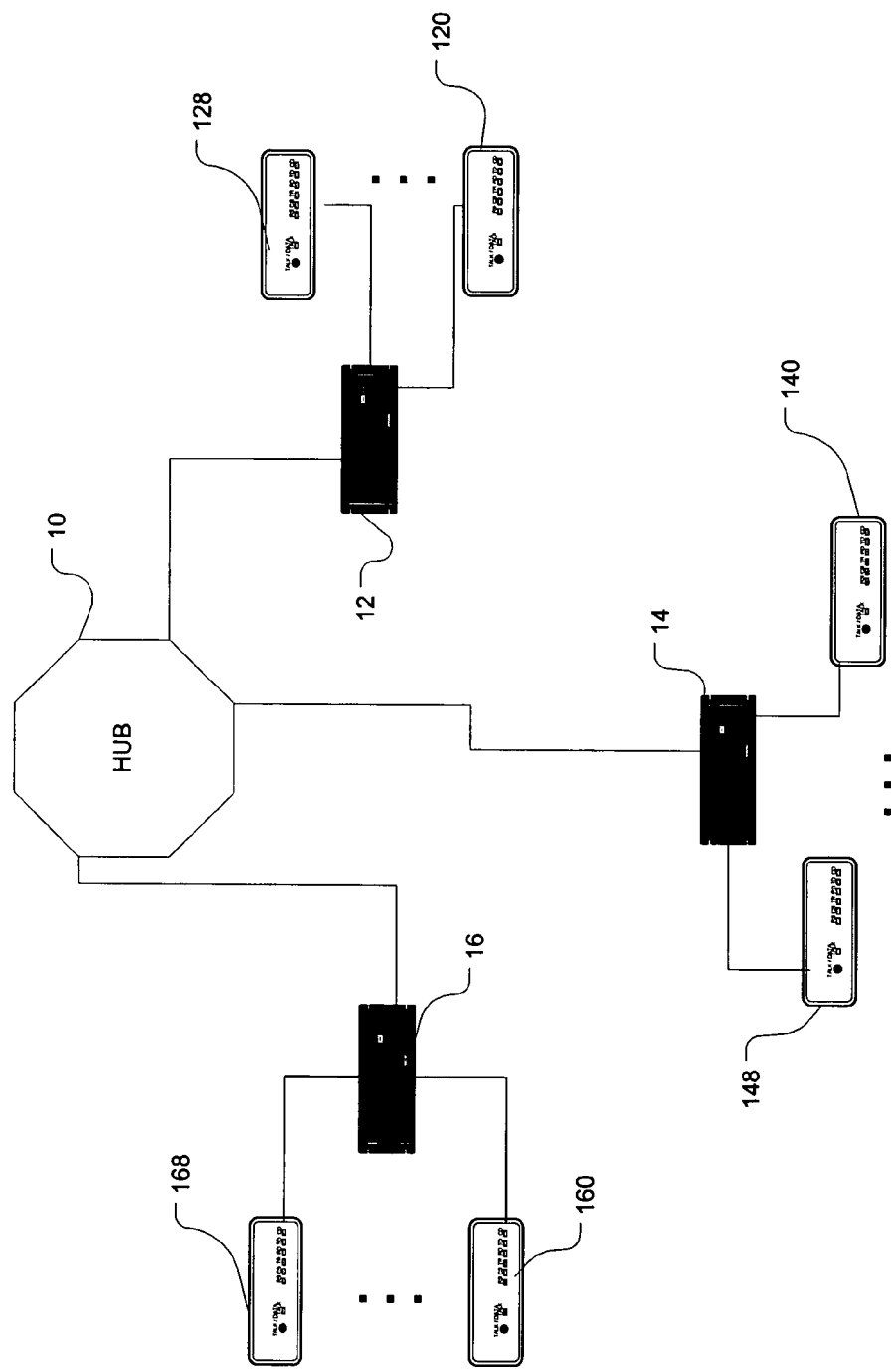
FIG. 1 shows an embodiment of a cable network.

FIG. 1 shows an embodiment of a portion of a cable network. The hub 10 may have several extremely high-speed incoming connections, such as a satellite downlink, a gigabit Ethernet (GigE) connection, etc., from which the hub is provided with content for the cable subscribers. In addition, the GigE connection or other network connection provides connection to the other devices on the Internet. This allows users to employ their cable connections for data communications.

The hub 10 communicates with several cable modem termination systems (CMTS), such as 12, 14 and 16 that either reside at the hub or are in sub-hubs connected to the hub. Each CMTS may have multiple user devices attached to it, such as 120-128 attached to CMTS 12, 140-148 attached to CMTS 14, and 160-168 attached to CMTS 16. A cable modem termination system may have thousands of individual user devices connected to it. These devices communicate on channels within the cable connection.

The cable connection may have 54 to 860 MHz of bandwidth at its disposal, as an example. This bandwidth is divided into channels, each generally between 5 an 52 MHz. The channels are identified by their frequencies within the overall connection frequency, similar to radio frequencies. These channels are usually referred to as RF channels.

It is possible, after a user device establishes a connection with the CMTS, a process during which it is assigned a service identifier (SID), that there is little or no communication upstream between the cable modem and the CMTS. For example, TV channel changes on a Set-Top-Box do not usually require upstream communications. The downstream communications are directed by the CMTS and do not compete for the upstream SIDs that have resulted in the limitations of the upstream SID address space. This seems to be especially true if the downstream device is a set-top box, rather than a cable modem.

Generally, cable modems are used for two-way communications and will have a higher level of upstream traffic than a set-top box. It is possible that a cable modem, when not being used by a user, may not have any upstream communications. Therefore, there is no intention of limiting the scope of the claims to set-top boxes, so the downstream devices such as cable modems and set-top boxes may be referred to as user devices with no limitation implied or to be inferred from that term.

Figure 2:
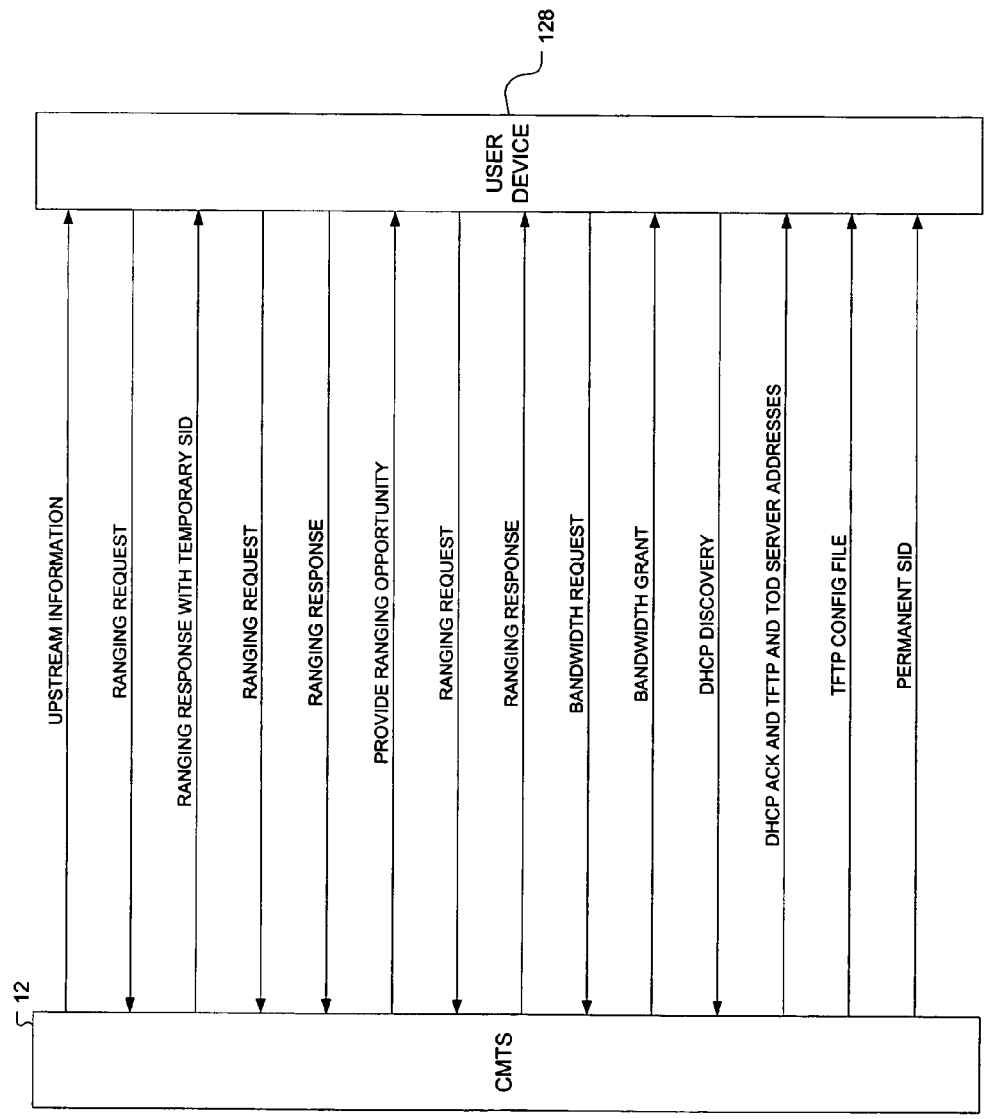
FIG. 2 shows an embodiment of a communication session between a cable modem and a cable modem termination system.

When a cable modem initially is powered up or otherwise begins the process of establishing connection with a CMTS, it is generally assumed that the CMTS is already functioning. An embodiment of this process is shown in FIG. 2. A CMTS 12 will generally transmit upstream information such as upstream channel designators at regular intervals on all of its downstream channels. Note that channels here refer to communications channels between the CMTS and the user device, not cable television channels. The user device will then being a process referred to as ranging, where the user device begins transmitting signals in 3 dB increments to attempt to synchronize between itself and the CMTS. The CMTS will typically assign a temporary SID to the user device, such as SID=1.

The user device may perform a finer level of ranging, such as at 0.25 dB increments to finely tune the connection. At this point, it may be said that the user device and the CMTS have established a link, but the user device is not generally considered to be 'online.' The user device will typically then issue a bandwidth request, to which the CMTS responds with a bandwidth grant. The user device will then initiate an address assignment, such as a DHCP (dynamic host configuration protocol) discovery request. It must be noted that the CMTS may not act as the DHCP server for the user device, as that may be a device on 'the other side' of the CMTS from the user device.

In the case of the user device being a set-top box, the DHCP request may not be necessary. However, as more and more communications systems use Internet Protocol (IP) addressing as their means of identifying devices, the possibility exists that the address process will occur even for a set-top box. In the specific embodiment of the address assignment process being DHCP, the CMTS will respond with an acknowledgement and the server addresses for a time of day (TOD) and trivial file transfer protocol (TFTP) server.

The user device accesses the TOD server to synchronize its clock with the CMTS and the rest of the network, as will access the TFTP server to acquire a configuration file. The configuration file may contain information related to quality of service parameters, security, applicable frequency assignments, and new software images or upgrades.

The user device then transmits to the CMTS and initiates a registration request. The CMTS respond with the configuration file. If the configuration file is valid, the CMTS assigns a permanent SID to the user device and registers the user device as online. This process may be repeated for each service flow or communication path between the user device and the CMTS. This consumes SIDs to the point where the limitations of the SID address space become a limitation on the operation of the CMTS.

It is possible for the user device, upon determining that it has no upstream communications, to assume a dormant state. This may allow the SIDs associated with that user device to be released, at least temporarily, to be used by other user devices. Essentially, the SIDs become shared between the current user device and other user devices. A flowchart for an embodiment of a process of having a user device assume a dormant state is shown in FIG. 3.

Figure 3:
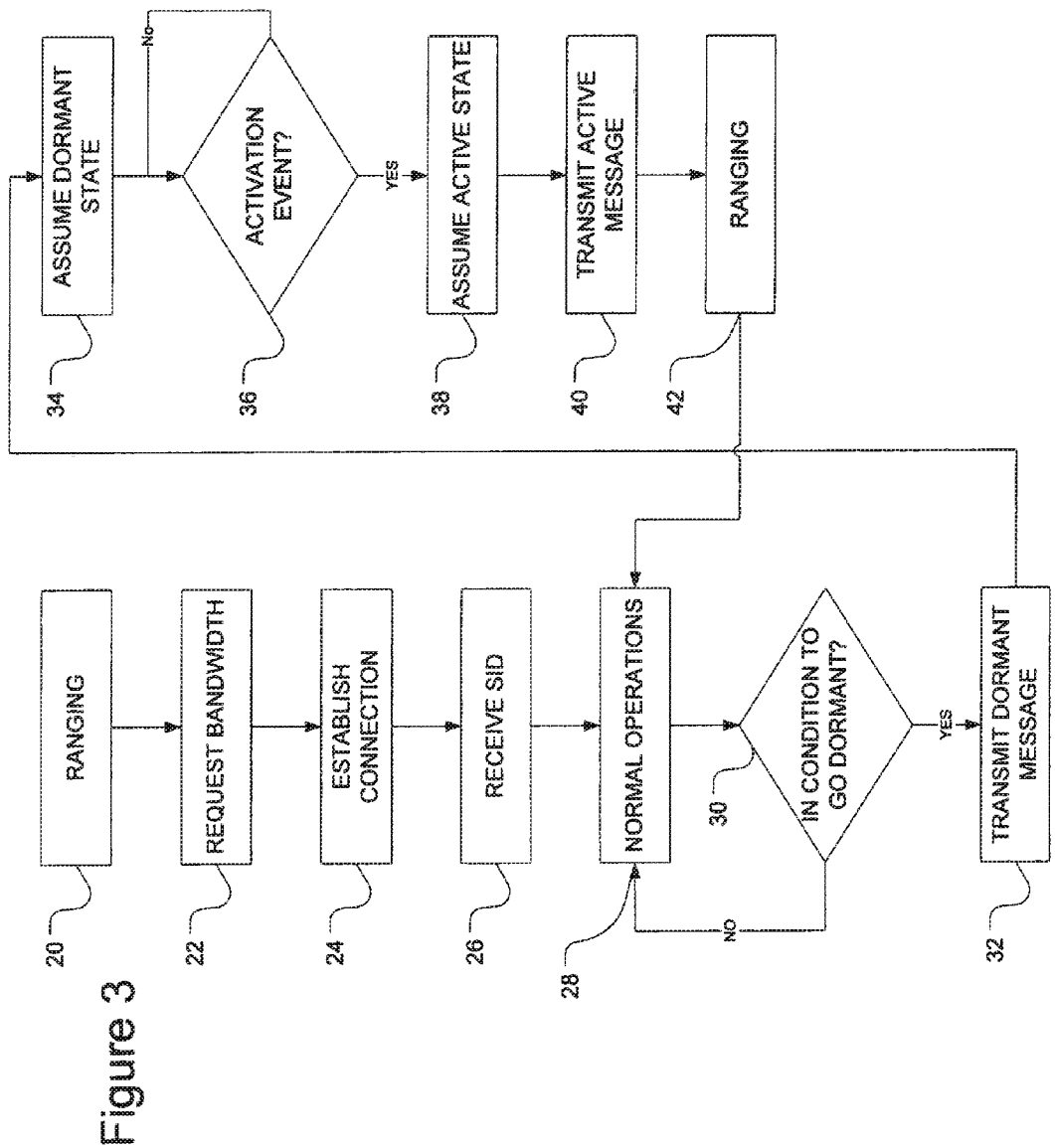
FIG. 3 shows a flowchart of an embodiment of a method of going dormant for a cable modem.

As shown in FIG. 3, the process starts at the point the user device becomes active, similar to the lower half of FIG. 2. The user device completes the ranging process at 20. The bandwidth request is transmitted at 22 and the connection is established at 24, similar to that discussed in FIG. 2. At 26, the SID for the user device is assigned and normal operations commence at 28.

At 30, the user device determines that it is in a condition that will allow it to assume a dormant state, or 'go dormant.' The conditions that would allow it to go dormant may include that there is no further upstream communications at this time, either initiated by the user of the device, or as part of a communication session initiated by the CMTS. The conditions that cause the device to be able to go dormant are dependent upon the nature of the network and the function of the user device and as such are left up to the system designer.

If the device is not in a condition to assume a dormant state at 30, normal operations continue at 28. If the device is in a condition to assume a dormant state at 30, a dormant message indicating that the device is assuming a dormant state is sent from the device to the CMTS at 32. The dormant state is then assumed at 34. These two processes may be achieved simultaneously or in the other order, with the device assuming a dormant state and then transmitting the message.

Once in the dormant state, the SIDs, service flows and any other network resources otherwise consumed by the active device are released. The device remains in the dormant state unless an activation event occurs at 36. The activation event may be one of several events, including an upstream communication requirement, or a request from the CMTS.

For example, the user could be watching television and changing channels while the device is in a dormant state. The user decides to watch a pay-per-view movie, which requires upstream communications from the set-top box to the CMTS, placing the order for the movie and transmitting the billing information. This will cause the device to become active. Alternatively, the CMTS may initiate some communication with the user device that requires the user device to become active.

The device then assumes an active state at 38, transmitting an active message to the CMTS to inform the CMTS that the user device is returning to active state. The ranging previously discussed is then performed at 42. It is possible that the active message is transmitted as part of the ranging process, such as in a ranging slot of the communication path.

Figure 4:
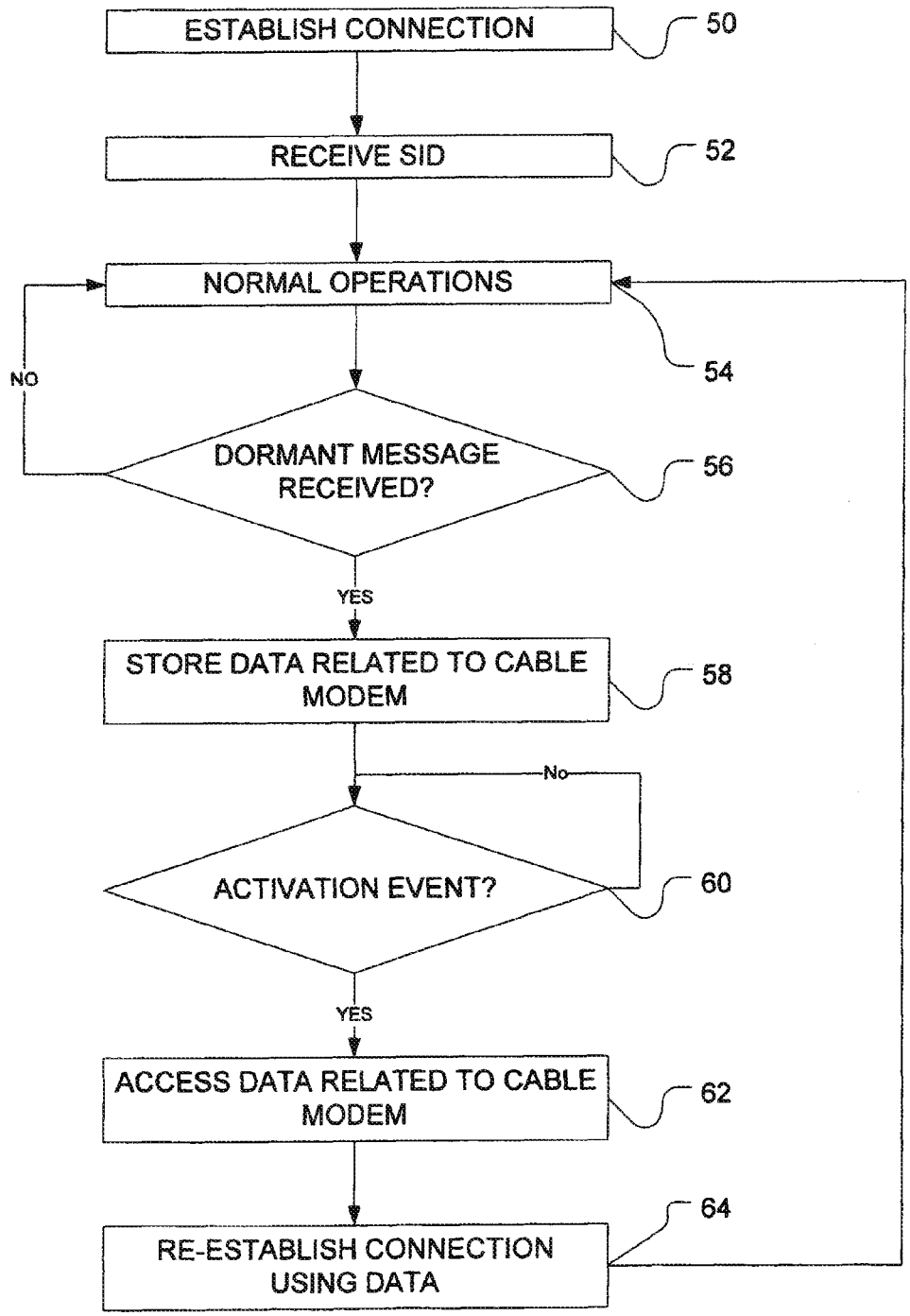
FIG. 4 shows a flowchart of an embodiment of a method of handling a dormant cable modem.

Management of this process from the CMTS perspective may also be needed to ensure that the benefits of the dormant state, such as release of the SIDs and service flows, are achieved. An embodiment of this process is shown in FIG. 4.

The connection between the CMTS and the user device is established as discussed previously at 50. The SID is assigned to the user device at 54. If a dormant message is received at 56, the CMTS stores the data related to that user device at 58. This may include the SID, service flows, etc. These resources are then released to be used by other devices in the network.

If the user device receives an activation event at 58, the data related to the user device is accessed at 62. The activation event may be the CMTS initiating communications with the user device that requires upstream communication from the user device, or the reception of an activation message from the user device. Upon receiving the activation event notification, the CMTS may access the data related to the user device to determine that this user device has already established communications and is a valid device, eliminating the need for that portion of the connection process. This data is then used to re-establish communications with the user device upon the user device performing ranging at 64, speeding the re-establishment process.

In this manner, SIDs of dormant devices may be re-used in the SID address space, increasing the number of devices supportable by one CMTS. This also eliminates the problems of confusion where the SIDs were assigned by upstream channel rather than being unique within a DOCSIS domain. The CMTS could be upgraded with additional instructions that allow it to dynamically determine which SID is assigned to which device, depending upon which device is active, allowing error-checking to be performed.

Similarly, current user devices could be upgraded with new software or other instructions that allow the dormant and activation messages to become part of their communications protocols. These upgrades may take the form of computer-readable media upon which are contained the instructions. The instructions, when executed by the computer, would cause the computer to perform the methods of the embodiments of the invention. Depending upon the instructions, the computer may be the user device or the CMTS.

Thus, although there has been described to this point a particular embodiment for a method and apparatus for increasing the SID address space and the number of supported devices on a DOCSIS interface, it is not intended that such specific references be considered as limitations upon the scope of this invention except in-so-far as set forth in the following claims.

What is claimed is:

1. A network device, comprising:
 a port to allow the device to communicate with a downstream device through an upstream channel and a downstream channel on a cable network, wherein the network device is configured to provide content for a user on the downstream channel;
 a processor to receive a message on the upstream channel indicating that the downstream device in communication with the network device is assuming a dormant state; and
 a memory to store data related to the upstream channel while the downstream device is dormant, wherein the data comprises data about service flows and service identifiers associated with the upstream channel and the downstream channel remains active while the downstream device is dormant and the network device continues to provide the content for the user on the downstream channel while the downstream device is dormant;
 wherein the processor is configured to release resources for the upstream channel in response to the message on the upstream channel indicating that the downstream device in communication with the network device is assuming the dormant state, the released resources comprising the service identifiers associated with the upstream channel.

2. The network device of claim 1, the processor further to:
 receive an activation message on the upstream channel from the downstream device in communication with the network device; and
 access the data related to the upstream channel to reactivate communications with the downstream device.

3. A network device, comprising:
 a port to allow the device to communicate with a downstream device through an upstream channel and a downstream channel on a cable network, wherein the network device is configured to provide content for a user on the downstream channel;
 a processor to receive a message on the upstream channel indicating that the downstream device in communication with the network device is assuming a dormant state; and
 a memory to store data related to the upstream channel while the downstream device is dormant, wherein the downstream channel remains active while the downstream device is dormant and the network device continues to provide the content for the user on the downstream channel while the downstream device is dormant;
 wherein the processor is configured to:
  release resources for the upstream channel and store a service identifier associated with the upstream channel and the downstream device in the memory in response to the message on the upstream channel indicating that the downstream device in communication with the network device is assuming the dormant state; and
  release the service identifier associated with the upstream channel of the downstream device for use with a different downstream device not previously associated with the service identifier.

4. The network device of claim 2, wherein the processor is further configured to determine that the downstream device is a valid device and that communications have been previously established with the downstream device in response to the data related to the upstream channel.

5. The network device of claim 3, the processor further to:
 receive an activation message on the upstream channel from the downstream device in communication with the network device; and
 access the data related to the upstream channel to reactivate communications with the downstream device.

6. The network device of claim 5, wherein the processor is further configured to determine that the downstream device is a valid device and that communications have been previously established with the downstream device in response to the data related to the upstream channel.

* * * * *